United States Patent
Kusakabe

(10) Patent No.: US 8,031,778 B2
(45) Date of Patent: Oct. 4, 2011

(54) PICTURE DECODING DEVICE AND METHOD

(75) Inventor: Toshihiko Kusakabe, Osaka (JP)

(73) Assignee: Panasonic Corporation, Osaka (JP)

( * ) Notice: Subject to any disclaimer, the term of this patent is extended or adjusted under 35 U.S.C. 154(b) by 841 days.

(21) Appl. No.: 11/795,406

(22) PCT Filed: Jan. 11, 2006

(86) PCT No.: PCT/JP2006/300659
§ 371 (c)(1),
(2), (4) Date: Apr. 15, 2008

(87) PCT Pub. No.: WO2006/075773
PCT Pub. Date: Jul. 20, 2006

(65) Prior Publication Data
US 2008/0225956 A1    Sep. 18, 2008

(30) Foreign Application Priority Data
Jan. 17, 2005   (JP) ................................. 2005-009568

(51) Int. Cl.
    *H04N 11/02* (2006.01)
(52) U.S. Cl. ......... 375/240.24; 375/240.17; 375/240.25; 375/240.26; 348/445; 348/565; 348/584
(58) Field of Classification Search ............. 375/240.17, 375/240.24, 240.25, 240.26; 348/445, 565, 348/584
See application file for complete search history.

(56) References Cited

U.S. PATENT DOCUMENTS

| 6,894,628 | B2 * | 5/2005 | Marpe et al. | 341/107 |
| 7,286,710 | B2 * | 10/2007 | Marpe et al. | 382/239 |
| 7,379,608 | B2 * | 5/2008 | Marpe et al. | 382/247 |
| 2004/0017852 | A1 * | 1/2004 | Garrido et al. | 375/240.16 |
| 2006/0013320 | A1 * | 1/2006 | Oguz et al. | 375/240.27 |
| 2007/0230564 | A1 * | 10/2007 | Chen et al. | 375/240.01 |

FOREIGN PATENT DOCUMENTS

JP    2003-304538    10/2003

OTHER PUBLICATIONS

Hae-Yong Kang et al., "MPEG4 AVC/H.264 Decoder with Scalable Bus Architecture and Dual Memory Controller", Circuits and Systems, 2004, ISCAS '04, Proceedings of the 2004 International Symposium on Vancouver, BC, Canada, May 23-26, 2004, Piscataway, NJ, USA, IEEE, US, May 23, 2004, pp. 145-148.

* cited by examiner

*Primary Examiner* — Ayaz Sheikh
*Assistant Examiner* — Andrew C Lee
(74) *Attorney, Agent, or Firm* — Wenderoth, Lind & Ponack, L.L.P.

(57) ABSTRACT

A picture decoding device (100) comprises a decoding unit (30), a frame memory (40), a deblocking filter (50), a macro block memory (60), and a control unit (70). The macro block memory (60) stores an unfiltered picture data, for which deblock-filtering is not performed, of the macro blocks adjoining a slice boundary. Decoding and deblock-filtering are performed for the macro blocks of each slice in a manner of pipeline processing, and the decoded picture data for the macro blocks is stored in the frame memory (40). After the pipeline processing for all of the macro blocks is completed, the second deblock-filtering is performed to the slice boundary-adjoining macro blocks, and the pixel values of the slice boundary-adjoining macro blocks already stored in the frame memory (40) are replaced. Thereby, the encoded picture data of arbitrary slice order can be completely decoded.

6 Claims, 13 Drawing Sheets

PICTURE DECODING DEVICE AND METHOD

TECHNICAL FIELD

The present invention relates to a picture decoding device operable to decode encoded picture data of ASO (arbitrary slice order) and arts related thereto.

BACKGROUND ART

MPEG (Moving Picture Experts Group) of ISO/IEC JTC 1 has recommended MPEG-4 Part 10: Advanced Video Coding (in the following, it is called MPEG-4 AVC for short) as a standard for the latest technology operable to encode moving picture data and to decode encoded picture data thereof. In the MPEG-4 AVC, in order to improve image quality at a low bit rate, an in-loop filter (it is also called a deblocking filter) is adopted to remove block distortion from a decoded picture. Due to the in-loop filter, it is possible to prevent occurrence of unfavorable situation such as block distortion of a picture is included in a reference picture and spreads to a decoded picture, thereby making it possible to acquire a decoded picture with good image quality.

The MPEG-4 AVC adopts a "slice" as a fundamental unit of encoding/decoding. A plurality of slices constitutes one picture. Regarding an arrangement of the slices within a picture, there is provided a function of ASO (arbitrary slice order). When using the ASO function, a plurality of slices within a picture can be transmitted in arbitrary order.

For example, when encoding a picture by dividing the picture into a plurality of slices, the picture is usually encoded and transmitted from a slice at the upper left of the picture, in a raster scan order. However, when using the ASO function, it is possible for the picture to be encoded and transmitted in order of importance of a slice, even if the slice is located in the middle of the picture.

Examples of practicing the ASO function are mentioned in the following. When the throughput of a decoder is insufficient, a picture is divided into a plurality of slices by an encoder, a slice of the important part in the picture is encoded earlier than the other slices within the same picture, and the encoded picture data is transmitted first. A decoder decodes only the encoded picture data of the important slice that is received first, and may perform skip processing without decoding the encoded picture data of the other slices. Thus, even when the throughput of the decoder is insufficient, the important part of the picture is decoded for certain and is provided for viewing.

FIG. 14 is a block diagram of a conventional picture decoding device 1 that is disclosed in Document 1 (Published Japanese patent application 2003-304538). The conventional picture decoding device 1 shown in FIG. 14 comprises a decoding unit 2, a frame memory 8, and an in-loop filter 9. The decoding unit 2 comprises a variable length decoding unit 3, a motion compensating unit 4, an inverse-quantizing unit 5, an inverse orthogonal transforming unit 6, and an adding unit 7.

The outline of operation of the conventional picture decoding device 1 is explained. The variable length decoding unit 3 decodes inputted variable length encoded picture data, and outputs quantized picture data and a motion vector. The inverse-quantizing unit 5 inverse-quantizes the quantized picture data, and outputs the inverse-quantized picture data. The inverse orthogonal transforming unit 6 performs inverse orthogonal transformation for the inverse-quantized picture data, and outputs a difference image. The motion compensating unit 4 generates a motion compensated picture (predicted picture) using the motion vector, which the variable length decoding unit 3 has outputted, and the decoded picture, which is already decoded and stored in the frame memory 8. The adding unit 7 adds the difference image outputted by the inverse orthogonal transforming unit 6 and the predicted picture outputted by the motion compensating unit 4, and generates a reconstructed picture. The in-loop filter 9 obtains a decoded picture by performing deblock-filtering to the reconstructed picture, and outputs the decoded picture to an output terminal while storing in the frame memory 8.

The in-loop filter 9 performs the deblock-filtering for the reconstructed picture. The deblock-filtering according to the MPEG-4 AVC is explained referring to FIG. 15. FIG. 15 shows a macro block boundary and a macro block arrangement. In the deblock-filtering for pixels belonging to a macro block A with the upper edge adjoining the macro block boundary, the pixel value is filtered using the pixel value of pixels belonging to a macro block B with the lower edge adjoining the macro block boundary. In the deblock-filtering for pixels belonging to a macro block C with the left side edge adjoining the macro block boundary, the pixel value is filtered using the pixel value of pixels belonging to a macro block D with the right side edge adjoining the macro block boundary. Therefore, when performing the in-loop filtering to a certain target macro block, decoding for a macro block located on the top of the target macro block and for the macro block located on the left of the target macro block has to be completed at that time. The art regarding the deblock-filtering is disclosed in Document 2 (Published Japanese patent application 2000-59769).

However, if the ASO function is adopted in the conventional picture decoding device 1 shown in FIG. 14, when a first slice, which is going to be transmitted in arbitrary order, starts in the middle of the picture, macro blocks located on the top of and on the left side of the boundary of the first slice are not yet decoded at a time when a macro block adjoining the boundary of the first slice is decoded, since the macro blocks located on the top of and on the left side of the boundary are included in a different slice. Therefore, when adopting the ASO function for the conventional picture decoding device 1, proper deblock-filtering to the macro block boundary cannot be performed. In other words, the conventional picture decoding device 1 cannot perform decoding of the encoded picture data of arbitrary slice order appropriately.

DISCLOSURE OF THE INVENTION

An object of the present invention is to provide a picture decoding device operable to decode encoded picture data of arbitrary slice order.

A first aspect of the present invention provides a picture decoding device comprising: a decoding unit operable to decode an encoded picture in arbitrary slice order through predetermined transformation processing, thereby generating a plurality of slices; a deblocking filter operable to filter the plurality of slices to generate a decoded picture; and a macro block memory operable to store an unfiltered picture of a macro block among macro blocks of the plurality of slices, the macro block adjoining a slice boundary between two adjacent slices of the plurality of slices; wherein the deblocking filter filters the macro block adjoining the slice boundary, using the unfiltered picture stored in the macro block memory.

According to the structure of the present invention, by providing a small-scale macro block memory, it is possible to realize a picture decoding device which is operable to perform deblock-filtering efficiently to encoded picture data of arbitrary slice order, thereby obtaining a preferably decoded picture.

A second aspect of the present invention provides the picture decoding device as defined in the first aspect, further comprising: a frame memory operable to store the decoded picture, wherein the deblocking filter filters the macro block adjoining the slice boundary, using the unfiltered picture stored in the macro block memory, to generate a new decoded picture, thereby replacing a part of the decoded picture stored in the frame memory with the new decoded picture.

According to the structure of the present invention, by using the frame memory and the small-scale macro block memory, the encoded picture data of arbitrary slice order can be decoded to compose a decoded picture on the frame memory, for which deblock-filtering is performed. Moreover, the decoded picture composed and stored in the frame memory after the deblock-filtering can be used preferably for decoding the subsequent encoded picture data.

A third aspect of the present invention provides the picture decoding device as defined in the second aspect, wherein the decoding unit decodes the encoded picture in order of inputting, to generate the plurality of slices, wherein the deblocking filter filters macro blocks included in the plurality of slices in order of generation of the respective slices, thereby generating first data composed of decoded pictures of the macro blocks included in the plurality of slices; wherein the frame memory stores the first data. When, among the plurality of slices, a first slice decoded earlier and a second slice decoded later are positioned across a slice boundary, first processing including the following is performed: processing that the macro block memory stores second data composed of an unfiltered picture of a slice boundary-adjoining macro block of the first slice; processing that the deblocking filter filters a slice boundary-adjoining macro block of the second slice using the second data stored in the macro block memory; processing that the deblocking filter re-filters the slice boundary-adjoining macro block of the first slice using the second data stored in the macro block memory, thereby generating third data composed of a re-filtered picture of the slice boundary-adjoining macro block of the first slice; and processing that the deblocking filter replaces, with the third data, at least a part of the first data for the slice boundary-adjoining macro block of the first slice, the first data being already stored in the frame memory.

According to the structure of the present invention, a plurality of the slices can be decoded in the order of inputting, irrespective of the location of the slices within the picture, thereby enabling efficient deblock-filtering.

A fourth aspect of the present invention provides the picture decoding device as defined in the second aspect, further comprising: a control unit operable to control the deblocking filter, the frame memory, and the macro block memory, thereby controlling filtering for macro blocks adjoining the slice boundary.

According to the structure of the present invention, using the macro block memory under the control of the control unit, the deblocking filter can perform deblock-filtering to the decoded picture of the macro block adjoining the slice boundary, irrespective of the order of inputting slices. Therefore, the picture decoding device operable to efficiently compose the decoded picture after deblock-filtering on the frame memory can be realized.

A fifth aspect of the present invention provides the picture decoding device as defined in the first aspect, wherein the decoding unit comprises: a variable length decoding unit operable to decode a variable length encoded picture of arbitrary slice order, thereby generating decoded data and a motion vector; an inverse-quantizing unit operable to inverse-quantize the decoded data, thereby generating transformed coefficients; an inverse orthogonal transforming unit operable to inverse-orthogonally transform the transformed coefficients to generate a difference picture; a motion compensation unit operable, in processing the decoded data for inter-frame encoded data, to generate a predicted picture from a decoded picture already decoded and stored in the frame memory, in accordance with the motion vector generated by the variable length decoding unit; and an adding unit operable to add the difference picture and the predicted picture, thereby generating a reconstructed picture.

According to the structure of the present invention, the decoding unit can efficiently decode the compressed, encoded picture data of arbitrary slice order.

A sixth aspect of the present invention provides the picture decoding device as defined in the first aspect, wherein decoding in the decoding unit and filtering in the deblocking filter are executed in a manner of pipeline processing.

According to the structure of the present invention, in decoding the encoded picture data of arbitrary slice order, the heavy-duty deblock-filtering can be performed in a manner of pipeline processing, in continuity of the decoding process of the decoding unit. Therefore, the entire decoding process can be performed at high speed. As a result, it is possible to realize the picture decoding device operable to process the encoded picture data of arbitrary slice order at high speed.

The above, and other objects, features and advantages of the present invention will become apparent from the following description read in conjunction with the accompanying drawings, in which like reference numerals designate the same elements.

BEST MODE FOR CARRYING OUT THE INVENTION

Hereafter, Embodiments of the present invention is explained referring to accompanying drawings.

In advance of explanation for Embodiments of the present invention, the example of analyses which the inventor of the present invention made on the extension of the conventional art is explained.

Figure 1:
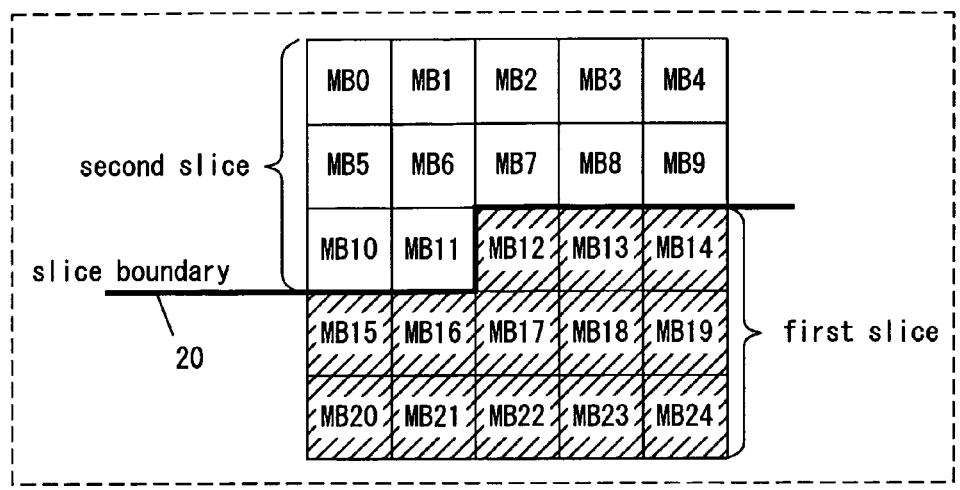
FIG. 1 illustrates construction of a picture that consists of two slices.

FIG. 1 illustrates the construction of a picture that consists of two slices. In the construction of the picture shown in FIG. 1, it is assumed that the picture consists of 25 macro blocks. The picture also consists of the first slice and the second slice. The first slice consists of from macro block MB12 to macro block MB24. The second slice consists of from macro block MB0 to macro block MB11. The first slice and the second slice are divided by a slice boundary 20. In addition, it is assumed that the first slice is inputted into the picture decoding device before the second slice is inputted.

Figure 2:
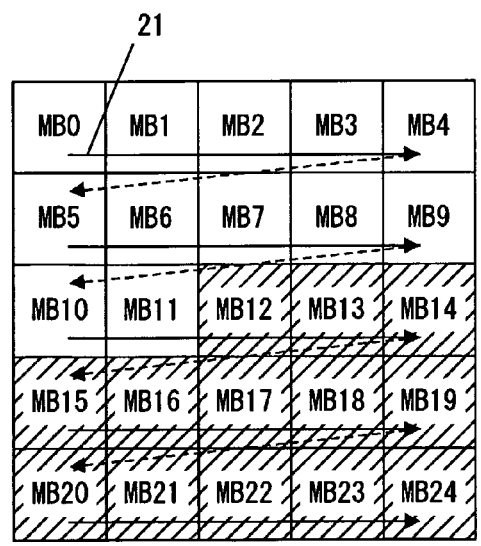
FIG. 2 shows processing order of deblock-filtering.

According to the MPEG-4 AVC, in the deblock-filtering of the macro block boundary, macro blocks are processed in order of a raster scan from a macro block that is located at the upper left of the picture. FIG. 2 illustrates the processing order of the deblock-filtering. The processing is performed in the order of raster scan from a macro block at the upper left to a macro block at the lower right as indicated by an arrow 21, or from the macro block MB0 to the macro block MB24. Thus, before performing the deblock-filtering, it is necessary to decode all of the slices that constitute the picture.

Figure 3:
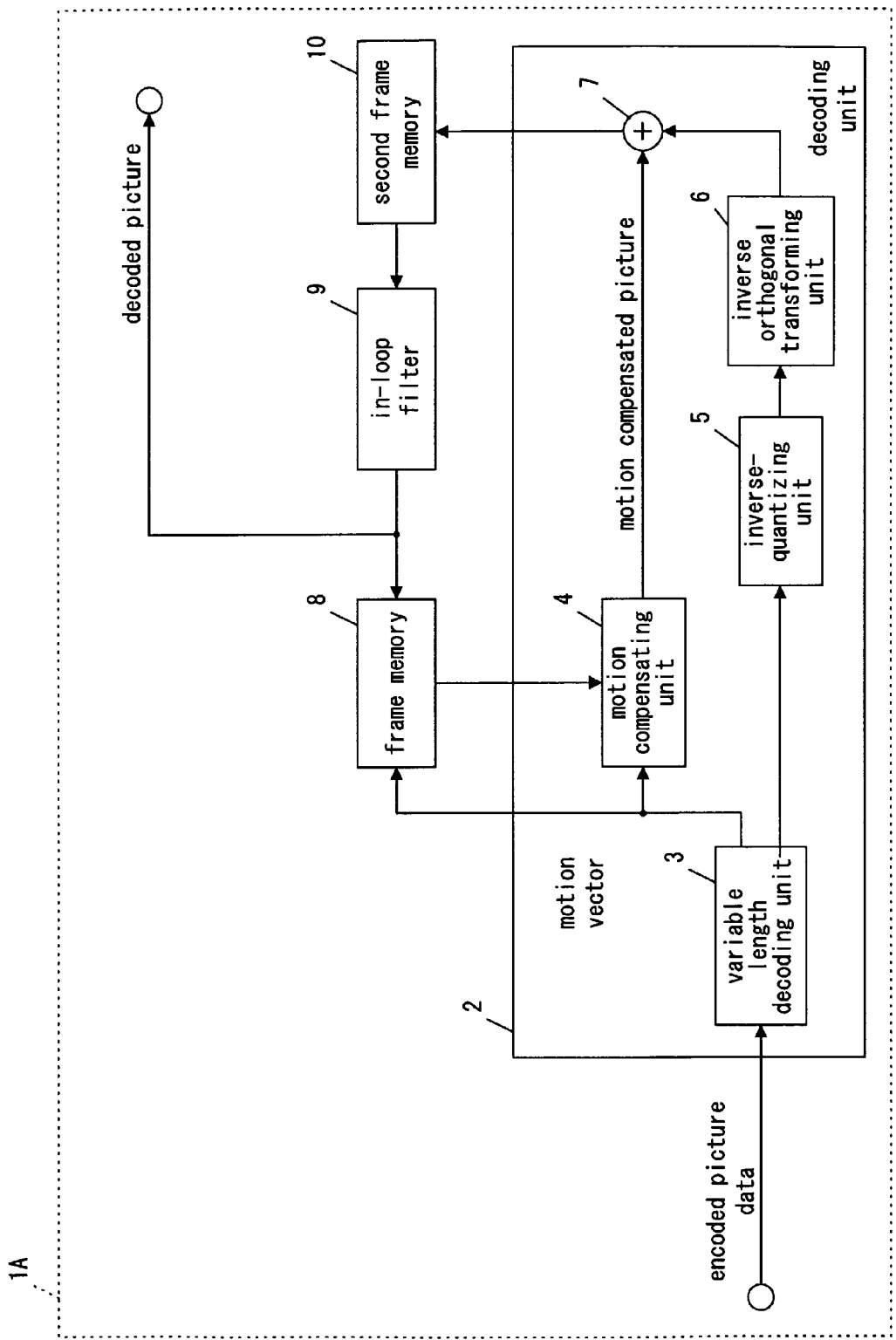
FIG. 3 is a block diagram of an improved picture decoding device corresponding to arbitrary slice order.
Figure 14:
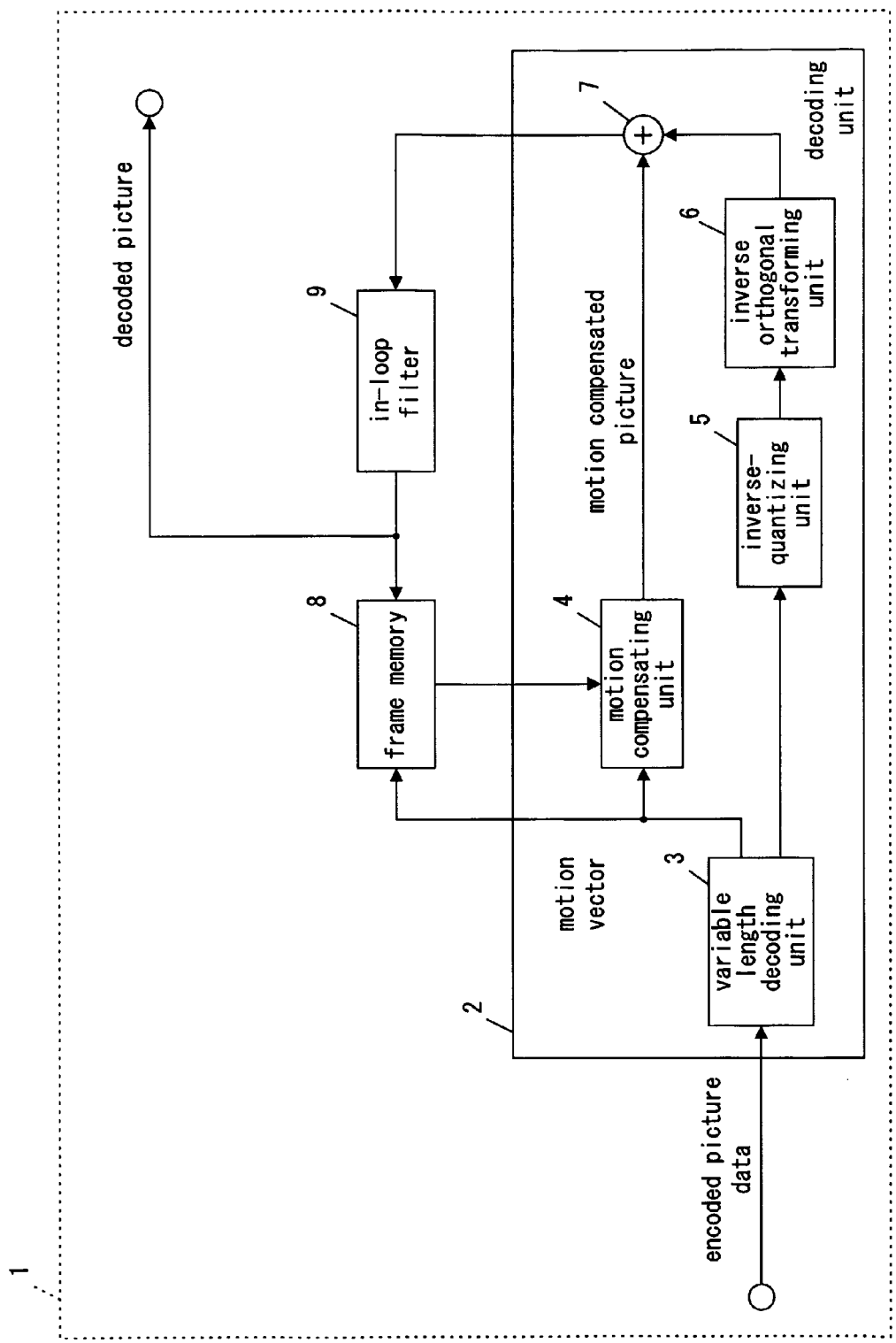
FIG. 14 is a block diagram of the conventional picture decoding device disclosed by MPEG-4 AVC.
Figure 15:
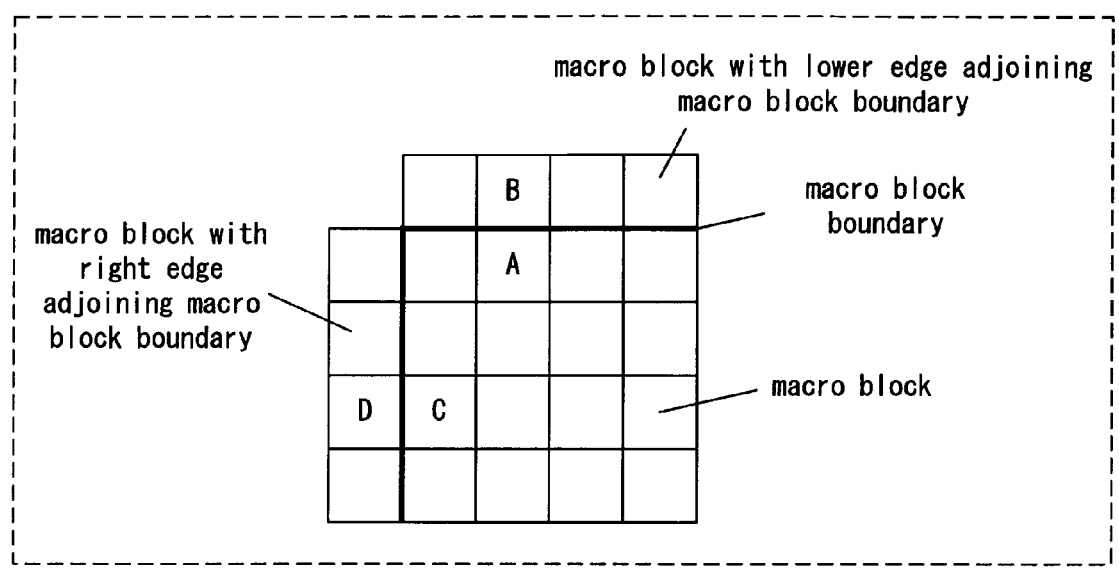
FIG. 15 illustrates an arrangement of a macro block boundary and macro blocks.

FIG. 3 is the block diagram of an improved picture decoding device 1A, which is configured by the present inventor on the extension of the conventional art, so as to treat encoded picture data in arbitrary slice order. The improved picture decoding device 1A shown in FIG. 3 newly installs a second frame memory 10 to the conventional picture decoding device 1 shown in FIG. 14, so that the improved picture decoding device 1A can perform decoding and deblock-filtering for the encoded picture data of arbitrary slice order. According to the structure, the decoding unit 2 decodes slices in the order of inputting, and outputs them to the second frame memory 10. After the completion of decoding the slices, the second frame memory 10 stores a reconstructed picture for one frame cumulatively. The in-loop filter 9 performs deblock-filtering to the reconstructed picture stored in the second frame memory 10 in the order shown in FIG. 2, independent of the order of inputting the slices, and stores the filtered, reconstructed picture (decoded picture) in the frame memory 8. As a result, the frame memory 8 stores the preferably decoded picture that is decoded from the encoded picture data of arbitrary slice order and properly processed by deblock-filtering.

Usually, in a picture decoding device of MPEG-4 AVC, the decoding process is performed in a manner of pipeline processing in a macro block unit.

Figure 4:
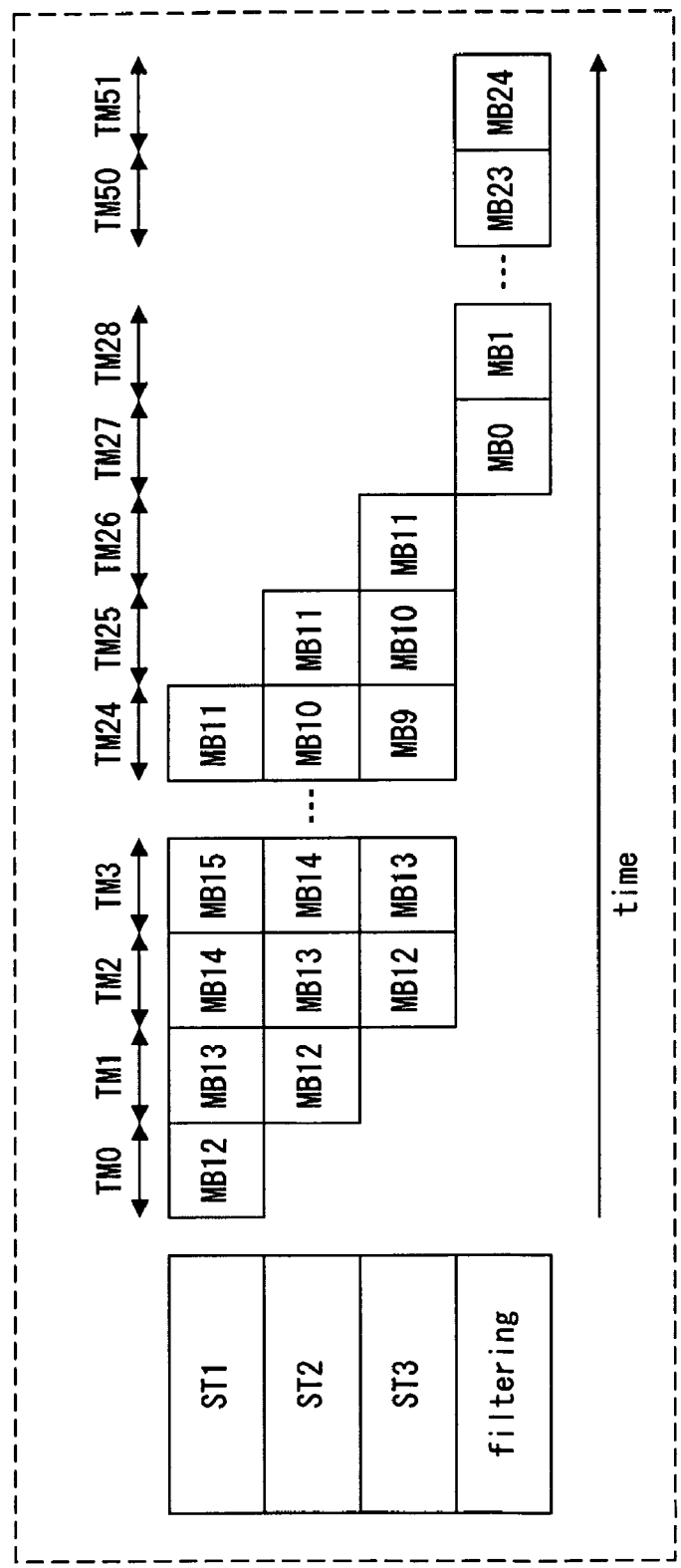
FIG. 4 illustrates steps of pipeline processing for an improved picture decoding device.

FIG. 4 illustrates the steps of the pipeline processing of the improved picture decoding device 1A shown in FIG. 3. In the following explanation, it is assumed that the improved picture decoding device 1A shown in FIG. 3 decodes the picture consisting of the first slice (the macro blocks MB12 to MB24) and the second slice (the macro blocks MB0 to MB11) shown in FIG. 1. Furthermore, it is assumed that the first slice is inputted to the improved picture decoding device 1A before the second slice is inputted.

In FIG. 4, the vertical direction indicates each stage of the pipeline processing. In other words, in FIG. 4, the pipeline processing consists of a first stage ST1 (for example, variable-length decoding), a second stage ST2 (for example, motion compensating), and a third stage ST3 (for example, inverse-quantizing, inverse orthogonal transforming, and adding).

In FIG. 4, the horizontal direction indicates time. At time TM0, the processing of the stage ST1 is performed to the macro block MB12 locating at the head of the first slice inputted first. At time TM1, the processing of the stage ST1 to the macro block MB13 and the processing of the stage ST2 to the macro block MB12 are performed in parallel. At time TM2, the processing of the stage ST1 to the macro block MB14, the processing of the stage ST2 to the macro block MB13, and the processing of the stage ST3 to the macro block MB12 are performed in parallel. When the processing of the stage ST3 is completed, the second frame memory 10 stores the macro block MB12.

In the subsequent steps, all of the other macro blocks belonging to the first slice and the macro blocks belonging to the second slice undergo the pipeline processing in the order of inputting, and are stored in the second frame memory 10. By time TM26, all of the macro blocks undergo the pipeline processing and are stored in the second frame memory 10 as a reconstructed picture.

At time TM27 to TM51, the deblock-filtering to the macro blocks MB0 to MB24 is performed in the order as shown in FIG. 2. The reconstructed picture after the deblock-filtering is outputted as a decoded picture, and stored in the frame memory 8.

As explained above, the improved picture decoding device 1A can perform the deblock-filtering appropriately. However, the improved picture decoding device 1A does not install the deblock-filtering in a stage of the pipeline processing; therefore, the improved picture decoding device 1A has to wait to perform the deblock-filtering until all the stages ST1 to ST3 of the pipeline processing are completed. Thus, the whole processing time is extended drastically. Furthermore, the second frame memory 10, which has the same scale as the frame memory 8, needs to be newly installed. Therefore, the circuit scale becomes larger.

The present inventor has devised the present invention from a new point of view based on the above consideration. Embodiments of the present invention are explained in the following.

Embodiment 1

Figure 5:
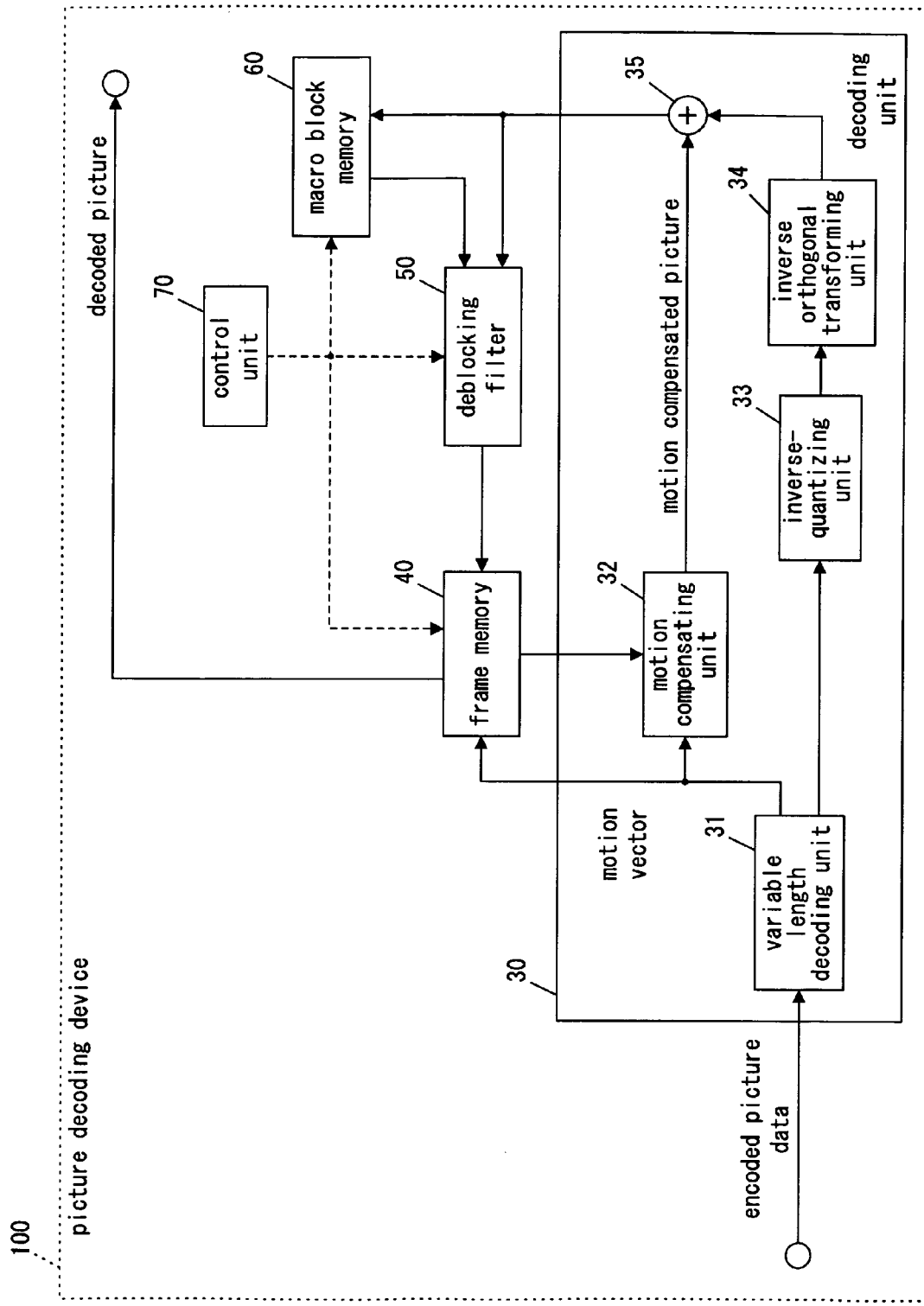
FIG. 5 is a block diagram of a picture decoding device in Embodiment 1 of the present invention.

FIG. 5 is the block diagram of a picture decoding device 100 in Embodiment 1 of the present invention. The picture decoding device 100 according to the present embodiment comprises a decoding unit 30, a frame memory 40, a deblocking filter 50, a macro block memory 60, and a control unit 70. The decoding unit 30 includes a variable length decoding unit 31, a motion compensating unit 32, an inverse-quantizing unit 33, an inverse orthogonal transforming unit 34, and an adding unit 35. The structure and operation of the decoding unit 30 are the same as those of the decoding unit 2 of the conventional picture decoding device 1, and they fall in the prior art category; therefore, the detailed explanation thereof is omitted.

The macro block memory 60 stores the picture before deblock-filtering or the unfiltered picture of a macro block with the upper edge or the left side edge adjoining the slice boundary.

The control unit 70 controls the deblock-filtering of the macro block adjoining the slice boundary, through the control of the frame memory 40, the deblocking filter 50, and the macro block memory 60.

In the following, the deblock-filtering performed by the picture decoding device 100 of the present embodiment is explained.

Figure 6:
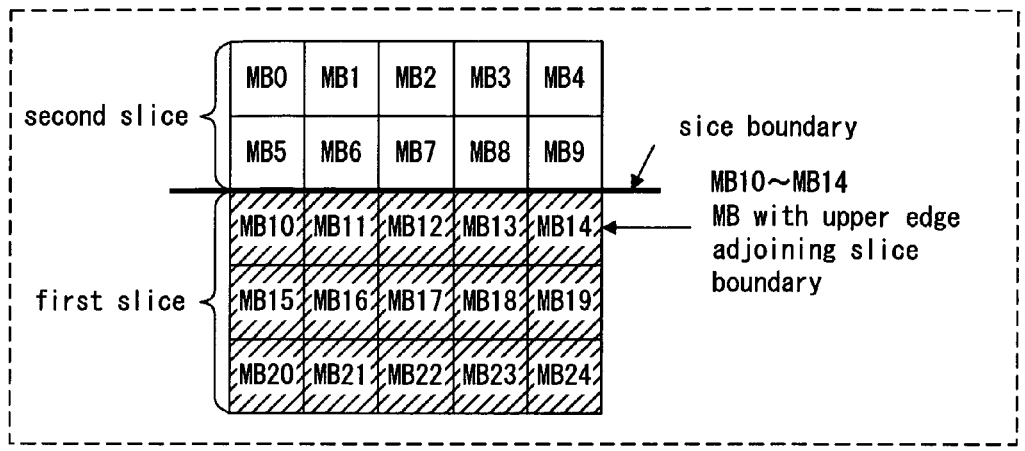
FIG. 6 illustrates construction of a picture that consists of a first slice and a second slice.

FIG. 6 illustrates the construction of a picture that consists of the first slice (the macro blocks MB10 to MB24) and the second slice (the macro blocks MB0 to MB9). It is assumed that the two slices are located above and bellow the slice boundary. It is also assumed that the first slice is inputted first and the second slice is inputted next. The macro blocks MB10 to MB14 adjoin the slice boundary at their upper edges.

Figure 7:
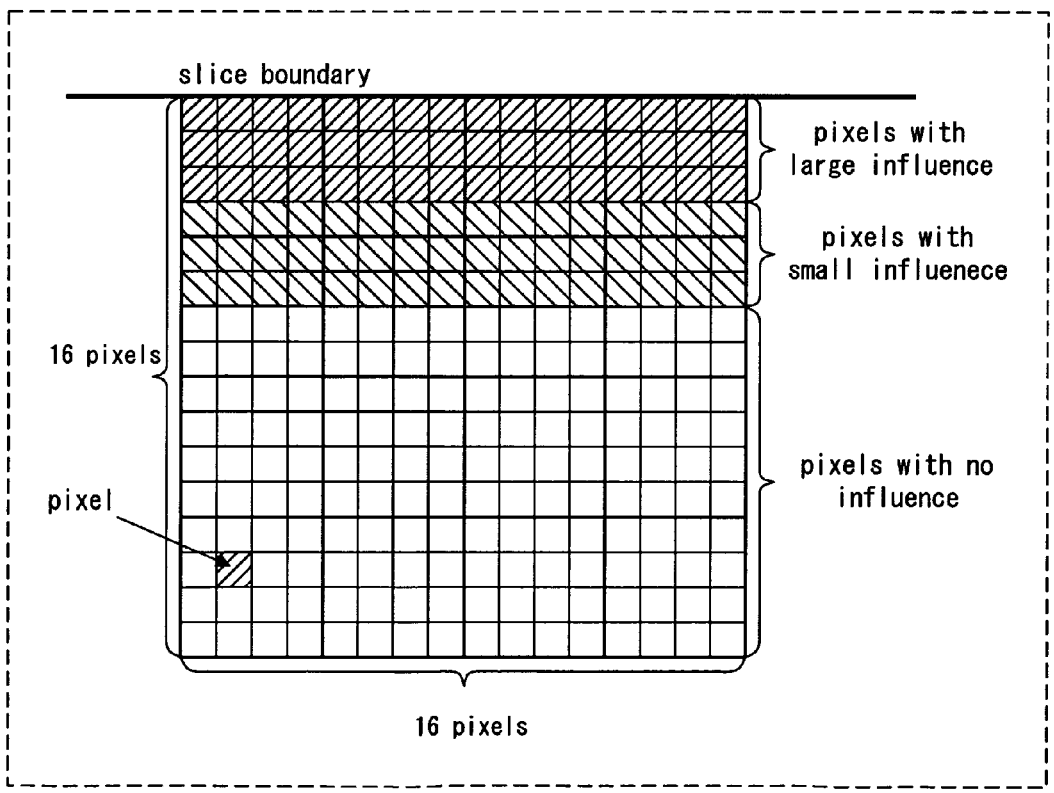
FIG. 7 illustrates a macro block of 16 pixels×16 pixels in detail.

FIG. 7 is the detailed drawing of the macro block that consists of 16 pixels×16 pixels. The present macro block adjoins the slice boundary at the upper edge, similar to the macro block MB10 of FIG. 6.

In a deblocking filter in accordance with MPEG-4 AVC, when the deblock-filtering is performed to a macro block with the upper edge adjoining the horizontal slice boundary as shown in FIG. 7, pixels of the three uppermost layers of the macro block are influenced most, pixels of the three next layers of the macro block are influenced slightly, and the other pixels located in the layers lower than the six top layers are not influenced at all.

When the deblock-filtering is performed to a macro block with the left side edge adjoining a vertical slice boundary (this is equivalent to a drawing that FIG. 7 is rotated 90 degrees counterclockwise), pixels of the three leftmost layers of the macro block are influenced most, pixels of the three next layers of the macro block are influenced slightly, and the other pixels located in the layers on the right side of the six leftmost layers are not influenced at all.

The picture decoding device 100 of the present embodiment uses the characteristics of the deblock-filtering of the MPEG-4 AVC, as mentioned above. In the following description, the deblock-filtering of the picture decoding device 100 of the present embodiment is applied to pictures consisting of two slices with different slice boundaries.

Figure 8:
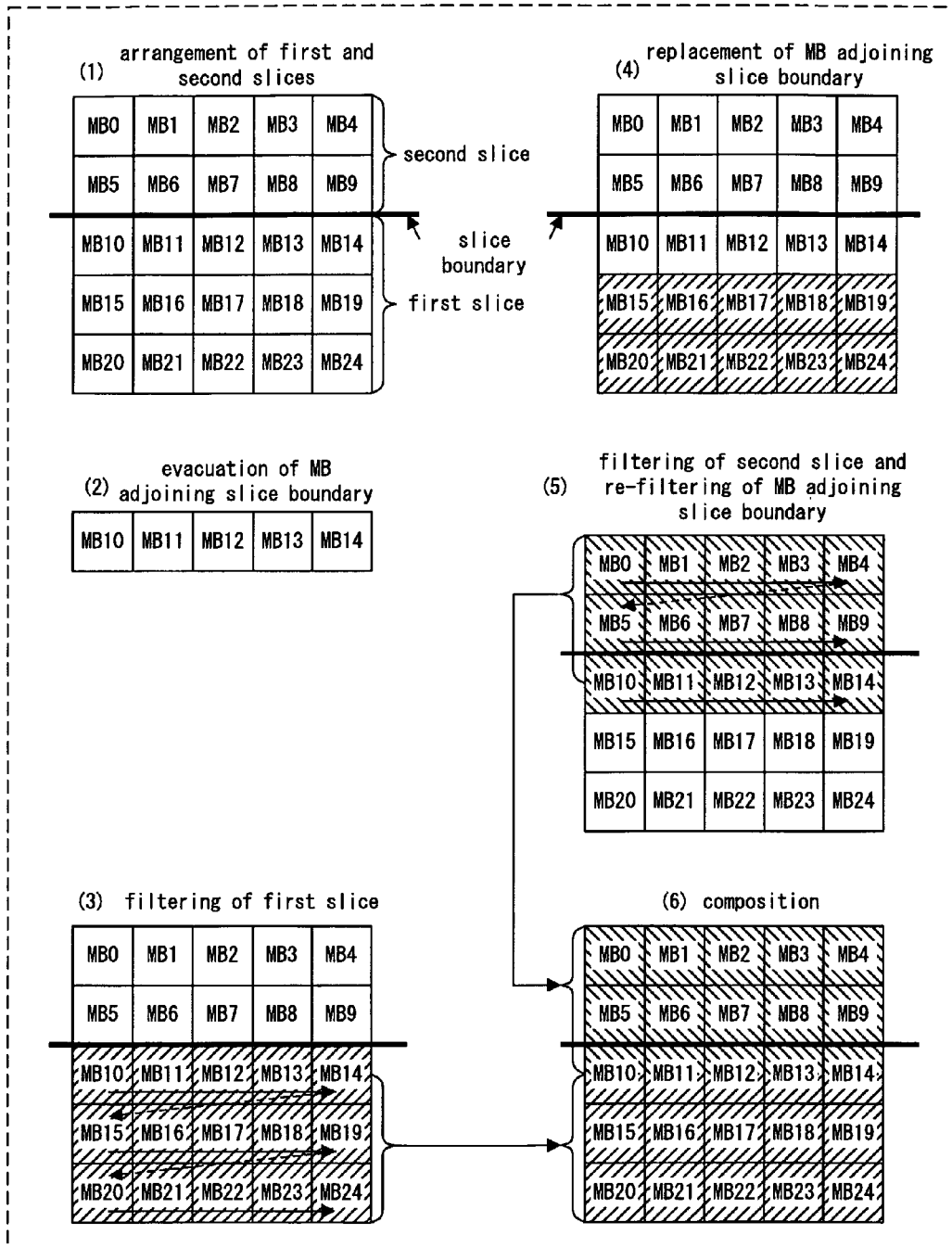
FIG. 8 is a first explanation figure of deblock-filtering in Embodiment 1 of the present invention.

FIG. 8 is the first explanation figure of the deblock-filtering in Embodiment 1 of the present invention. Referring to FIG. 8, the explanation is made step by step as follows.

Step (1): Arrangements of the First and Second Slices

In the picture shown in FIG. 8, the first slice (the macro blocks MB10 to MB24) inputted first is located bellow the slice boundary and the second slice (the macro blocks MB0 to MB9) inputted next is located above the slice boundary.

Step (2): Evacuation of Macro Blocks Adjoining the Slice Boundary

The decoding unit 30 of FIG. 5 decodes the macro blocks MB10, MB11, MB12, . . . , and MB24 in the order of inputting the macro blocks, and sends the decoded picture data to the deblocking filter 50 as pre-filtering picture data or unfiltered picture data (the unfiltered picture data is equivalent to reconstructed picture data). Regarding the macro blocks MB10 to MB14 with the upper edges adjoining the slice boundary, the decoding unit 30 stores the unfiltered picture data of the macro blocks in the macro block memory 60 simultaneously.

Step (3): Filtering of the First Slice

Regarding the macro blocks MB10 to MB24 of the first slice, the deblocking filter 50 performs the deblock-filtering to the unfiltered picture data of each macro block in the order of macro blocks outputted by the decoding unit 30 as shown by the arrow (FIG. 8 (3)), and stores the picture data after deblock-filtering in the frame memory 40 as decoded picture data. At this time, however, regarding the macro blocks MB10 to MB14 that adjoin the slice boundary, proper deblock-filtering is not performed partially, since the macro blocks of the second slice, which are located above the macro blocks MB10 to MB14 across the slice boundary, are not yet decoded.

Step (4): Replacement of Macro Blocks Adjoining the Slice Boundary

Before the deblock-filtering of the second slice, the macro blocks MB10 to MB14 of the first slice adjoining the slice boundary are replaced with the unfiltered picture data that are stored in the macro block memory 60 at Step (2).

Step (5): Filtering of the Second Slice and Re-Filtering of the Macro Blocks Adjoining the Slice Boundary The decoding unit 30 decodes the macro blocks MB0 to MB9 of the second slice in the order of inputting the macro blocks, and sends the decoded picture data to the deblocking filter 50 as unfiltered picture data. Regarding the macro blocks MB0 to MB9 of the second slice, the deblocking filter 50 performs the deblock-filtering to the unfiltered picture data of each macro block in the order of the macro blocks outputted by the decoding 30 as shown by the arrow (FIG. 8 (5)) and stores the decoded picture data in the frame memory 40.

Then, the deblocking filter 50 performs the second deblock-filtering to the macro blocks MB10 to MB14 of the first slice adjoining the slice boundary, to which the proper deblock-filtering has not been performed at Step (3), using the macro blocks MB5 to MB9 of the second slice for which decoding has just been performed.

Step (6): Composition

As explained referring to FIG. 7, in the macro blocks MB10 to MB14 of the first slice adjoining the slice boundary, the pixels of the six uppermost layers of the macro blocks are influenced by the second deblock-filtering at Step (5). Therefore, regarding the macro blocks MB10 to MB14, for which the deblock-filtering is already performed and the decoded picture data thereof are stored in the frame memory 40 at Step (3), the decoded picture data of pixels belonging to the eight uppermost layers including the influenced, six uppermost layers of the macro blocks are replaced with the corresponding decoded picture data of the pixels for which the second deblock-filtering is performed at Step (5).

By the above-described steps, the deblock-filtering as illustrated in the first explanation figure of FIG. 8 is completed.

Figure 9:
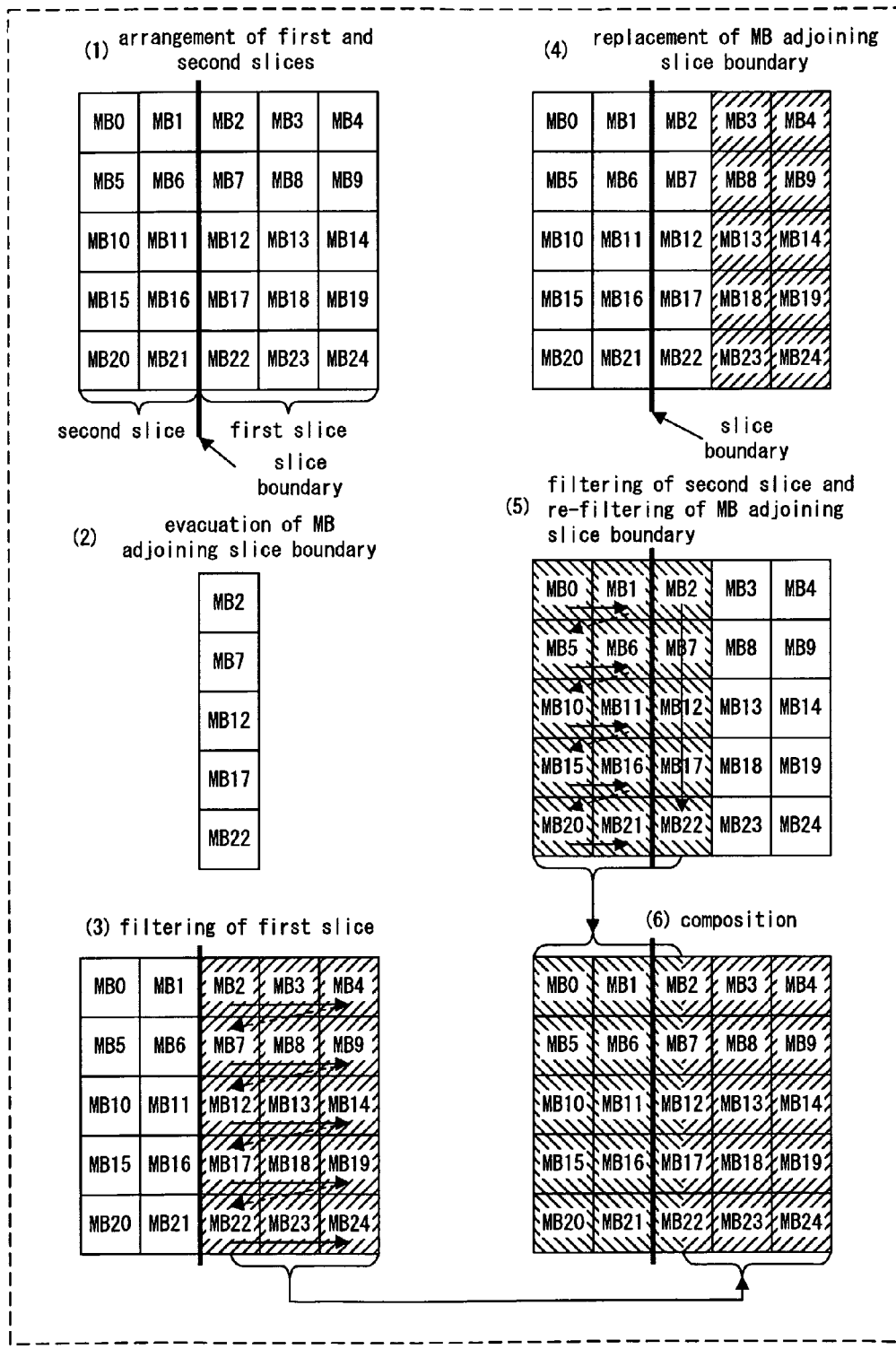
FIG. 9 is a second explanation figure of deblock-filtering in Embodiment 1 of the present invention.

FIG. 9 is the second explanation figure of the deblock-filtering in Embodiment 1 of the present invention. Now, refer to FIG. 9.

Step (1): Arrangements of the First and Second Slices

In the picture shown in FIG. 9, the first slice (the macro blocks MB2 to MB4, MB7 to MB9, MB12 to MB14, MB17 to MB19, and MB22 to MB24), inputted first is located on the right side of the slice boundary. The second slice (the macro blocks MB0, MB1, MB5, MB6, MB10, MB11, MB15, MB16, MB20, and MB21) inputted next is located on the left side of the slice boundary.

Step (2): Evacuation of Macro Blocks Adjoining the Slice Boundary

The decoding unit 30 of FIG. 5 decodes the macro blocks MB2 to MB4, MB7 to MB9, MB12 to MB14, MB17 to MB19, and MB22 to MB24 of the first slice in the order of inputting the macro blocks, and sends the decoded picture data to the deblocking filter 50 as unfiltered picture data. Regarding the macro blocks MB2, MB7, MB12, MB17, and MB22 with the left edges adjoining the slice boundary, the decoding unit 30 stores the unfiltered picture data of the macro blocks in the macro block memory 60, simultaneously.

Step (3): Filtering of the First Slice

Regarding the macro blocks MB2 to MB4, MB7 to MB9, MB12 to MB14, MB 17 to MB 19, and MB22 to MB24 of the first slice, the deblocking filter 50 performs the deblock-filtering to the unfiltered picture data of each macro block in the order of macro blocks outputted by the decoding unit 30 as shown by the arrow (FIG. 9 (3)), and stores the picture data after deblock-filtering in the frame memory 40 as decoded picture data. At this time, however, regarding the macro blocks MB2, MB7, MB12, MB17, and MB22 that adjoin the slice boundary, proper deblock-filtering is not performed partially, since the macro blocks of the second slice, which are located on the left side of the macro blocks MB2, MB7, MB12, MB17, and MB22 across the slice boundary, are not yet decoded.

Step (4): Replacement of Macro Blocks Adjoining the Slice Boundary

Before the deblock-filtering of the second slice, the macro blocks MB2, MB7, MB12, MB17, and MB22 of the first slice adjoining the slice boundary are replaced with the unfiltered picture data that are stored in the macro block memory 60 at Step (2).

Step (5): Filtering of the Second Slice and Re-Filtering of the Macro Blocks Adjoining the Slice Boundary The decoding unit 30 decodes the macro blocks MB0, MB1, MB5, MB6, MB10, MB11, MB15, MB16, MB20, and MB21 of the second slice, and sends the decoded picture data to the deblocking filter 50 as unfiltered picture data.

Regarding the macro blocks MB0, MB1, MB5, MB6, MB10, MB11, MB15, MB16, MB20, and MB21 of the second slice, the deblocking filter 50 performs the deblock-filtering to the unfiltered picture data of each macro block in the order of the macro blocks outputted by the decoding unit 30 as shown by the arrow (FIG. 9 (5)) and stores the decoded picture data in the frame memory 40.

Then, the deblocking filter 50 performs the second deblock-filtering to the macro blocks MB2, MB7, MB12, MB17, and MB22 of the first slice adjoining the slice boundary, to which the proper deblock-filtering has not been performed at Step (3), using the macro blocks MB1, MB6, MB11, MB16, and MB21 of the second slice for which decoding has just been performed.

Step (6): Composition

As explained referring to FIG. 7, in the macro blocks MB2, MB7, MB12, MB17, and MB22 of the first slice adjoining the slice boundary, the pixels of the six leftmost layers of the macro blocks are influenced by the second deblock-filtering at Step (5). Therefore, regarding the macro blocks MB2, MB7, MB12, MB17, and MB22, for which the deblock-filtering is already performed and the decoded picture data thereof are stored in the frame memory 40 at Step (3), the decoded picture data of pixels belonging to the eight leftmost layers including the influenced, six leftmost layers of the macro block are replaced with the corresponding decoded picture data of the pixels for which the second deblock-filtering is performed at Step (5).

By the above-described steps, the deblock-filtering as illustrated in the second explanation figure of FIG. 9 is completed.

Figure 10:
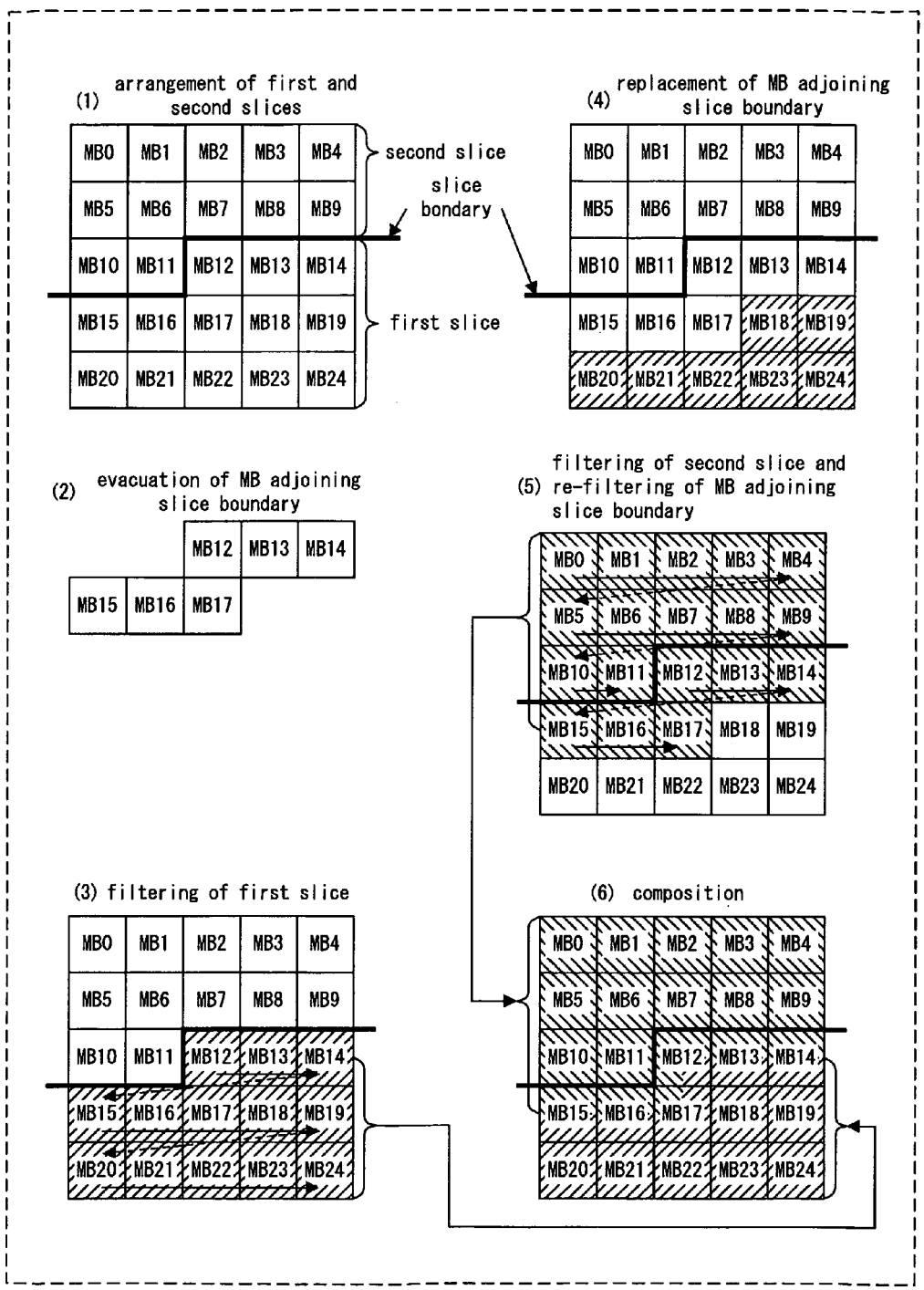
FIG. 10 is a third explanation figure of deblock-filtering in Embodiment 1 of the present invention.

FIG. 10 is the third explanation figure of the deblock-filtering in Embodiment 1 of the present invention. Now, refer to FIG. 10.

Step (1): Arrangements of the First and Second Slices

In the picture shown in FIG. 10, the first slice (the macro blocks MB12 to MB24) inputted first is located bellow the cranked slice boundary, and the second slice (the macro blocks MB0 to MB11) inputted next is located above the cranked slice boundary.

Step (2): Evacuation of Macro Blocks Adjoining the Slice Boundary

The decoding units 30 of FIG. 5 decodes the macro blocks MB12, MB13, MB 14, . . . , and MB24 in the order of inputting the macro blocks, and sends the decoded picture data to the deblocking filter 50 as unfiltered picture data. Regarding the macro blocks MB12, MB13, MB14, MB15, and MB16 with the upper edges adjoining the slice boundary, and the macro block MB17 with the upper left corner adjoining the slice boundary, the decoding unit 30 stores the unfiltered picture data of the macro blocks in the macro block memory 60, simultaneously.

Step (3): Filtering of the First Slice

Regarding the macro blocks MB12 to MB24 of the first slice, the deblocking filter 50 performs the deblock-filtering to the unfiltered picture data of each macro block in the order of macro blocks outputted by the decoding unit 30 as shown by the arrow (FIG. 10 (3)), and stores the picture data after deblock-filtering in the frame memory 40 as decoded picture data. At this time, however, regarding the macro blocks MB12 to MB16 that adjoin the slice boundary, proper deblock-filtering is not performed partially, since the macro blocks of the second slice located above or on the left of the slice boundary are not yet decoded. As for the macro block MB17, proper deblock-filtering is not performed partially since it is influenced by the macro blocks MB12 and MB15.

Step (4): Replacement of Macro Blocks Adjoining the Slice Boundary

Before the deblock-filtering of the second slice, the macro blocks MB12, MB13, MB14, MB15, MB16, and MB17 of the first slice adjoining the slice boundary are replaced with the unfiltered picture data that are stored in the macro block memory 60 at Step (2).

Step (5): Filtering of the Second Slice and Re-Filtering of Macro Blocks Adjoining the Slice Boundary The decoding unit 30 decodes the macro blocks MB0 to MB11 of the second slice in order of inputting the macro blocks, and sends the decoded picture data to the deblocking filter 50 as unfiltered picture data. Regarding the macro blocks MB0 to MB11 of the second slice, the deblocking filter 50 performs the deblock-filtering to the unfiltered picture data of each macro block in the order of the macro blocks outputted by the decoding unit 30 as shown by the arrow (FIG. 10 (5)) and stores the decoded picture data in the frame memory 40.

Then, the deblocking filter 50 performs the second deblock-filtering to the macro blocks MB12, MB13, MB14, MB15, MB16, and MB17 of the first slice adjoining the slice boundary, to which the proper deblock-filtering has not been performed at Step (3), using the macro blocks MB7 to MB11 of the second slice for which decoding has just been performed. The macro block MB17 is influenced because the second deblock-filtering is performed to the macro block MB12 located thereabove and the macro block MB16 located on the left side thereof. Thus, the second deblock-filtering is performed for the macro block MB17.

Step (6): Composition

In the macro blocks MB12, MB13, MB14, MB15, and MB16 of the first slice adjoining the slice boundary, the pixels of the six uppermost layers of the macro blocks are influenced by the second deblock-filtering at Step (5). Therefore, regarding the macro blocks MB12, MB13, MB14, MB15, and MB16, for which the deblock-filtering is already performed and the decoded picture data thereof are stored in the frame memory 40 at Step (3), the decoded picture data of pixels belonging to the eight uppermost layers including the influenced, six uppermost layers of the macro block are replaced with the corresponding decoded picture data of the pixels for which the second deblock-filtering is performed at Step (5).

Furthermore, in the macro block MB12, the pixels of the six leftmost layers adjoining the slice boundary are influenced by the second deblock-filtering at Step (5). Therefore, at Step (5), the decoded picture data of the pixels of the eight leftmost layers of the macro block MB12 are replaced with the corresponding decoded picture data of the pixels for which the second deblock-filtering is performed. As a result, the pixel values of three-quarter the pixels belonging to the macro block MB12 are replaced by the decoded picture data after deblock-filtering.

Moreover, by the similar reason, in the macro block MB17, the decoded picture data of one-quarter the pixels located at the upper left of the macro block are replaced with the corresponding decoded picture data of the pixels after the second deblock-filtering is performed.

By the above-described steps, the deblock-filtering as illustrated in the third explanation figure of FIG. 10 is completed.

As explained above, the picture decoding device 100 of the present embodiment performs the decoding process and the deblock-filtering for each slice in the order of inputting slices. The picture decoding device 100 performs the second deblock-filtering for a macro block of the slice with the upper or left edge adjoining the slice boundary, and replaces the pixel value of influenced pixels with the pixel value after the second deblock-filtering. The processing method described above enables the picture decoding device 100 to perform the decoding process and the first deblock-filtering in a manner of pipeline processing.

Figure 11:
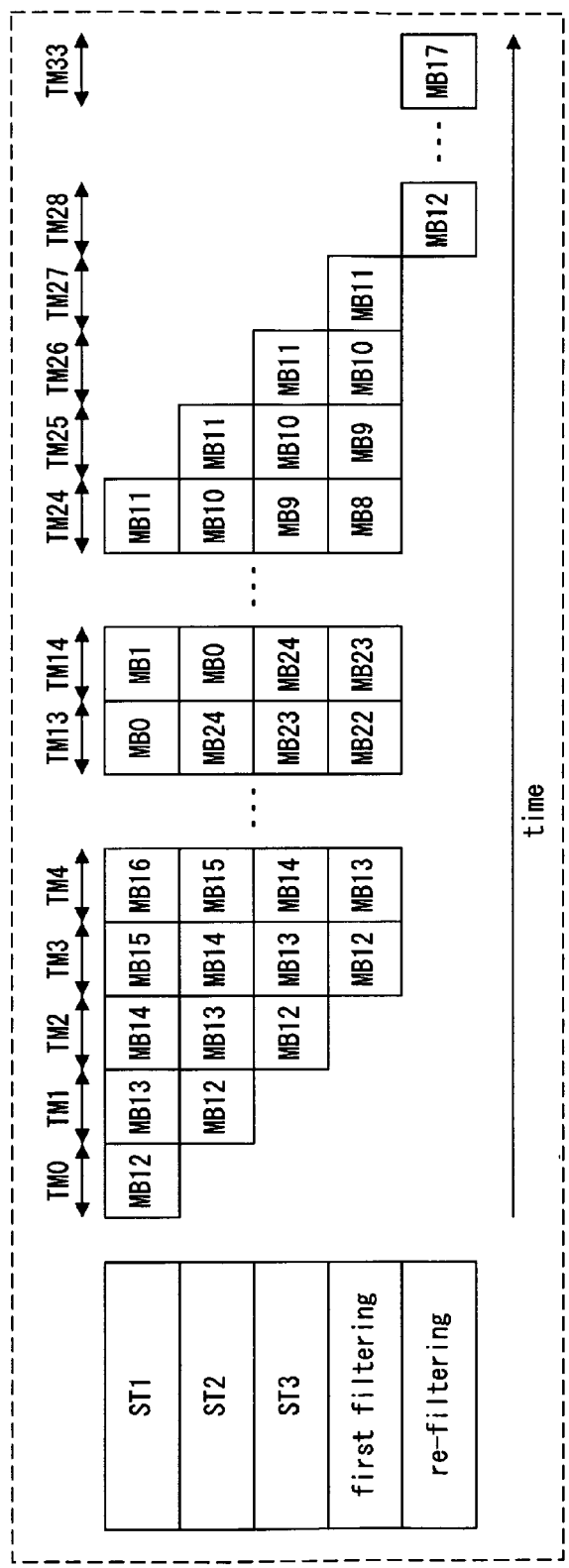
FIG. 11 illustrates steps of pipeline processing for the picture decoding device in Embodiment 1 of the present invention.

FIG. 11 illustrates the steps of the pipeline processing in the picture decoding device 100 of Embodiment 1 of the present invention.

In the following explanation, in order to compare the present embodiment with the improved picture decoding device 1A explained previously, it is assumed that the picture decoding device 100 of the present embodiment performs the decoding process for the picture consisting of the first slice (the macro blocks MB12 to MB24) inputted first and the second slice (the macro blocks MB0 to MB11) inputted next, as shown in FIG. 1.

In FIG. 11, the vertical direction indicates each stage of the pipeline processing. In other words, in FIG. 11, the pipeline processing consists of the first stage ST1 (for example, variable-length decoding), the second stage ST2 (for example, inverse-quantizing and inverse orthogonal transforming), the third stage ST3 (for example, motion compensating and adding), and the fourth stage ST4 (first deblock-filtering).

In FIG. 11, the horizontal direction indicates time. At time TM0, processing of the stage ST1 to the macro block MB12 at the head of the first slice is performed. At time TM1, processing of the stage ST1 to the macro block MB13 and processing of the stage ST2 to the macro block MB12 are performed in parallel. At time TM2, processing of the stage ST1 to the macro block MB14, processing of the stage ST2 to the macro block 13, and processing of the stage ST3 to the macro block MB12 are performed in parallel. At time TM3, processing of the stage ST1 to the macro block 15, processing of the stage ST2 to the macro block 14, processing of the stage ST3 to the macro block MB13, and processing of the stage ST4 to the macro block MB12 are performed in parallel. After the processing of the stage ST4 is completed, the deblock-filtered picture data of the macro block MB12 is stored in the frame memory 40 as decoded picture data.

In the following time periods, the pipeline processing for the rest of the macro blocks of the first slice and the second slice is performed in the order of inputting the macro blocks. By time T 27, the pipeline processing for all of the macro blocks is completed, and the decoded picture data of each macro block is stored in the frame memory 40.

When the processing of the stage ST3 is completed for the macro blocks with the upper edge, the left side edge, or the upper left corner adjoining the slice boundary (they are the macro blocks MB12 to MB17 in the example), unfiltered picture data of the macro blocks are stored in the macro block memory 60 while they are sent to the stage ST4.

After a series of pipeline processing at time TM0 to TM27 is completed as mentioned above, at time TM28 to TM33, the second deblock-filtering to the macro blocks MB12 to MB17 adjoining the slice boundary and the partial replacement are performed, and a perfect decoded picture is composed on the frame memory 40.

The unfiltered picture data stored in the macro block memory 60 is referred to when the second deblock-filtering to the macro blocks MB12 to MB17 adjoining the slice boundary is performed at the stage ST4.

Thus, in the picture decoding device 100 of the present embodiment, the decoding process and the first deblock-filtering can be performed in a manner of pipeline processing.

When comparing the pipeline processing of the image decoding device 100 shown in FIG. 11 and the pipeline processing of the improved picture decoding device 1A shown in FIG. 4, the improved picture decoding device 1A can not perform the deblock-filtering in a manner of pipeline processing (therefore, the time period from time TM0 to TM51 is necessary to complete the deblock-filtering processing), on the contrary, the picture decoding device 100 of the present embodiment can perform up to the first deblock-filtering in a manner of pipeline processing (therefore, only the time period from time TM0 to TM27 was necessary to complete the deblock-filtering processing). Therefore, the processing time can be drastically reduced in the picture decoding device 100 of the present embodiment. In the picture decoding device 100 of the present embodiment, the second deblock-filtering is performed to the macro blocks adjoining the slice boundary after the pipeline processing. However, the processing amount necessary for the second deblock-filtering is little compared to the first deblock-filtering. Therefore, the effect obtained by installing the deblock-filtering into the pipeline processing is very remarkable.

Figure 12:
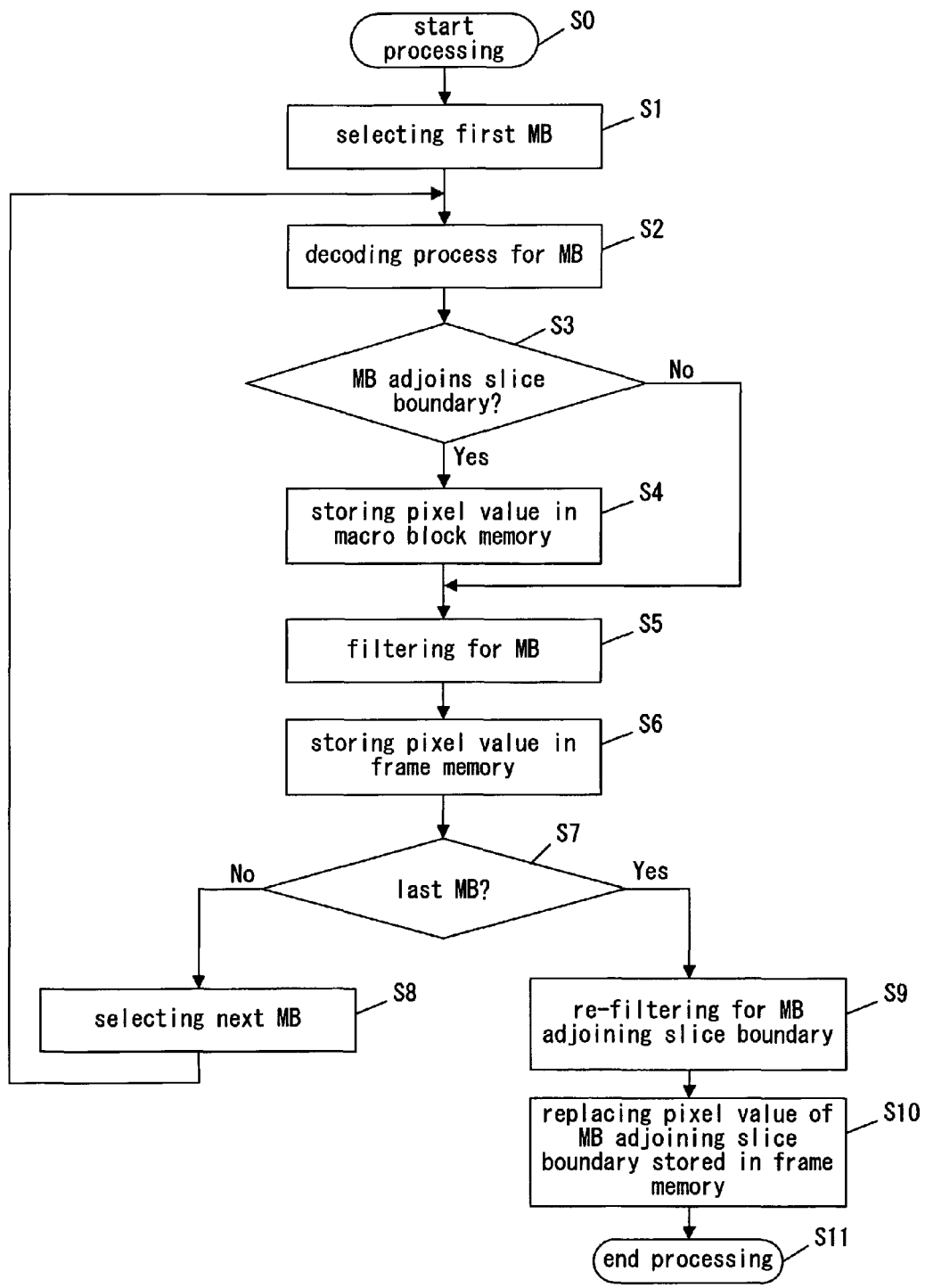
FIG. 12 is a flow chart of the picture decoding device in Embodiment 1 of the present invention.

FIG. 12 is the flow chart of the picture decoding device 100 in Embodiment 1 of the present invention. Referring to FIG. 12, the processing flow of the picture decoding device 100 of the present embodiment is explained.

At step S0, the processing starts. At step S1, the decoding unit 30 selects the first macro block of a slice that is inputted first. At step S2, the decoding unit 30 performs the variable-length decoding for the selected macro block (it is hereafter called a target macro block), and obtains the decoded pixel value (that is, the unfiltered picture data).

At step S3, the decoding unit 30 judges whether the target macro block is a slice boundary-adjoining macro block (that is, a macro block with the upper edge, the left side edge, or the left corner adjoining the slice boundary). When the judgment result is "Yes" (the target macro block is a slice boundary-adjoining macro block), the control is moved to step S4. When the judgment result is "No" (the target macro block is not a slice boundary-adjoining macro block), the control is moved to step S5.

At step S4, the decoding unit 30 stores the decoded pixel value (the unfiltered picture data) of the target macro block into the macro block memory 60, since the target macro block is a slice boundary-adjoining macro block.

At step S5, the deblocking filter 50 performs the deblock-filtering to the decoded pixel value (the unfiltered picture data) of the target macro block.

At step S6, the deblocking filter 50 stores the picture data of the target macro block after filtering into the frame memory 40 as the decoded picture data.

At step S7, the decoding unit 30 judges whether the target macro block is the last macro block of the last slice. When the judgment result is "No" (the target macro block is not the last macro block), the control is moved to step S8. When the judgment result is "Yes" (the target macro block is the last macro block), the control is moved to step S9.

At step S8, the decoding unit 30 selects the next macro block, returns the control to step S2, and repeats the processing from step S2 to step S7.

At step S9, the deblocking filter 50 performs the second deblock-filtering to the macro block adjoining the slice boundary by using the unfiltered picture data stored in the macro block memory 60.

At step S10, regarding the macro blocks of the first slice adjoining the slice boundary, the deblocking filter 50 partially replaces the pixel value (the part of the decoded picture data for which the deblock-filtering is not correctly performed), stored in the frame memory 40 at step S6, with the pixel value after the second deblock-filtering (the decoded picture data for which the deblock-filtering is correctly performed).

At step S11, the processing ends.

By the above-mentioned processing, the encoded data of arbitrary slice order is decoded and undergoes deblock-filtering, thereby; the perfect decoded picture data is completed in the frame memory 40.

In addition, the second deblock-filtering at step S9 and step S10 is performed under the control of the control unit 70.

Moreover, a series of the processing from step S1 to S8 is practiced in a manner of pipeline processing.

In the description mentioned above, the embodiment of the present invention is explained for the case where a picture consists of two slices of arbitrary slice order, the picture decoding device 100 of the present embodiment is not limited to the case, but can be equally applied to a case where a picture consists of three or more slices of arbitrary slice order.

Although the picture decoding device 100 of the present embodiment shown in FIG. 5 comprises the control unit 70, as one of the elements, operable to control the frame memory 40, deblocking filter 50, and the macro block memory 60, a CPU existing in the exterior of the picture decoding device 100 may substitute the control unit 70 in function.

Embodiment 2

Figure 13:
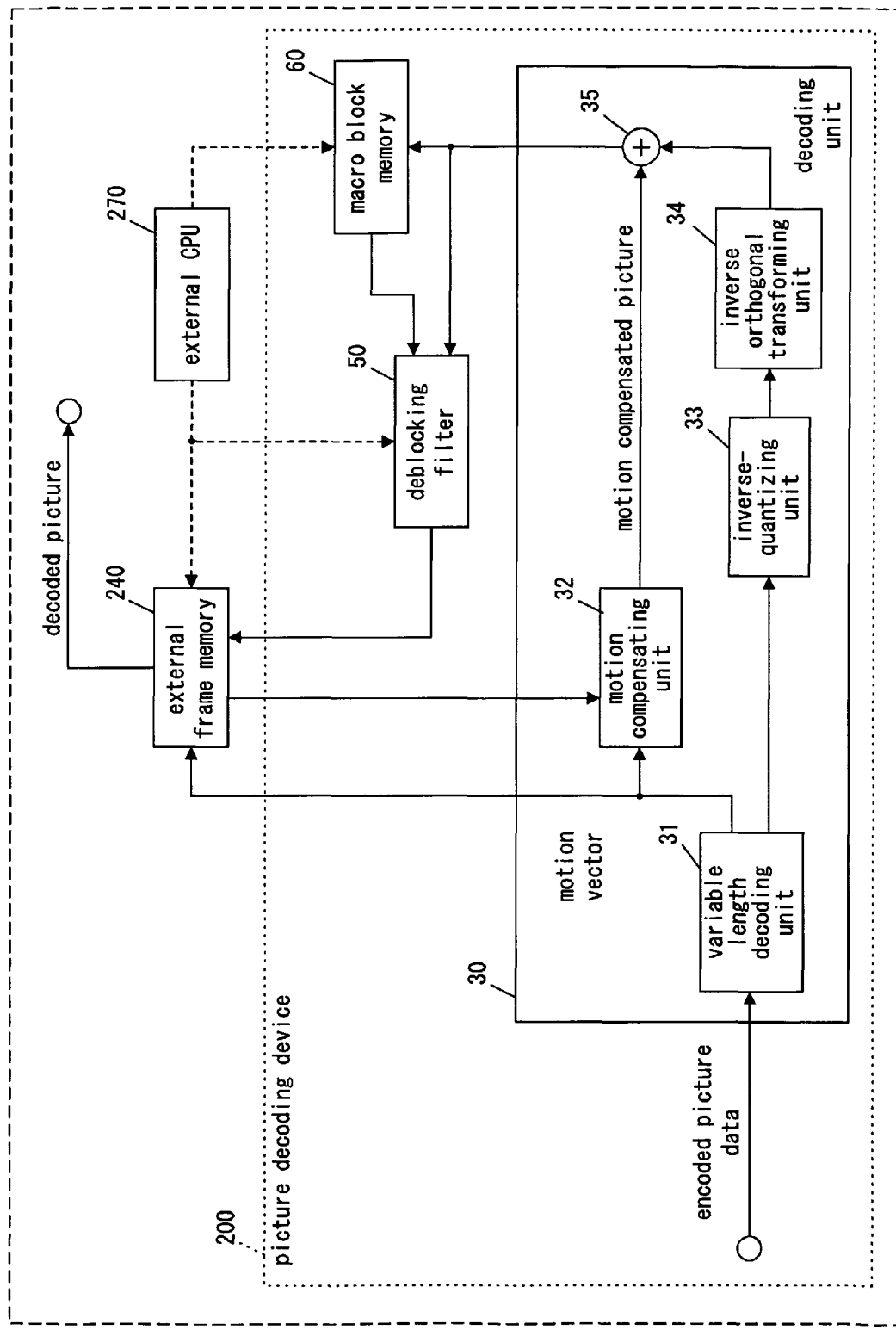
FIG. 13 is a block diagram of a picture decoding device in Embodiment 2 of the present invention.

FIG. 13 is the block diagram of a picture decoding device in Embodiment 2 of the present invention. In FIG. 13, the same symbols are given to elements each having the same function as elements of FIG. 5 in order to omit explanation.

The picture decoding device 200 of the present embodiment comprises the decoding unit 30, the deblocking filter 50, and the macro block memory 60. The decoding unit 30 includes the variable length decoding unit 31, the motion compensating unit 32, the inverse-quantizing unit 33, the inverse orthogonal transforming unit 34, and the adding unit 35.

The picture decoding device 200 of the present embodiment uses an external frame memory 240 located in the exterior of the picture decoding device 200, instead of the frame memory 40 of the picture decoding device 100 in Embodiment 1 of the present invention. The picture decoding device 200 also uses an external CPU 270 located in the exterior, instead of the control unit 70 of the picture decoding device 100 in Embodiment 1.

In other words, the external frame memory 240 stores decoded picture data after deblock-filtering which the deblocking filter 50 outputs, and outputs reference picture data to the motion compensating unit 32. The external CPU 270 controls the frame memory 40, the deblocking filter 50, and the macro block memory 60, and then controls deblock-filtering for macro blocks adjoining a slice boundary.

By using the external frame memory 240 and the external CPU 270, similar to the picture decoding device 100 of Embodiment 1 of the present invention, the picture decoding device 200 of the present embodiment can decode encoded picture data of arbitrary slice order in the order of inputting slices, perform deblock-filtering, and complete the decoded picture data in the external frame memory 240.

In the picture decoding device 200 of the present embodiment, pipeline processing is performed for variable-length decoding by the decoding unit 30 and deblock-filtering by the deblocking filter 50. The detail is the same as that of the pipeline processing in Embodiment 1 of the present invention shown in FIG. 11.

Among macro blocks of the first slice inputted earlier, macro blocks adjoining the slice boundary between the first slice and the second slice inputted later undergo the above-mentioned deblock-filtering in a manner of pipeline processing, then the second deblock-filtering, thereby; a new decoded picture data is generated and used to replace the corresponding decoded picture data already stored in the external frame memory 240.

In this case, the macro block memory 60 stores the unfiltered picture data of the macro blocks adjoining the slice boundary. The deblocking filter 50 performs deblock-filtering to the macro blocks adjoining the slice boundary using the unfiltered picture data stored in the macro block memory 60. Thus, in the deblock-filtering to the macro blocks adjoining the slice boundary, the operation and role of the macro block memory 60 of the present embodiment are the same as those of the macro block memory 60 in Embodiment 1 of the present invention. Therefore, detailed explanation is omitted.

As explained above, the purpose of the present invention is to provide a picture decoding device operable to decode encoded picture data of arbitrary slice order; therefore, as long as it falls in the purpose of the present invention, various modifications are possible.

According to the present invention, it is possible to provide the picture decoding device operable to efficiently decode the encoded picture data of arbitrary slice order.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

INDUSTRIAL APPLICABILITY

The picture decoding device related to the present invention can be used, for example, in a cellular phone with a built-in camera, an image device for the Internet connection, a picture device dealing a compressed moving picture, and the other applied fields.

The invention claimed is:

1. A picture decoding device comprising:
a decoding unit operable to decode an encoded picture in arbitrary slice order through predetermined transformation processing, thereby generating a plurality of slices;

a deblocking filter operable to filter the plurality of slices to generate a decoded picture;

a macro block memory operable to store an unfiltered picture of a macro block among macro blocks of the plurality of slices, the macro block adjoining a slice boundary between two adjacent slices of the plurality of slices; and a frame memory operable to store the decoded picture, wherein said deblocking filter filters the macro block adjoining the slice boundary, using the unfiltered picture stored in said macro block memory, wherein said deblocking filter filters the macro block adjoining the slice boundary, using the unfiltered picture stored in said macro block memory, to generate a new decoded picture, thereby replacing a part of the decoded picture stored in said frame memory with the new decoded picture, wherein said decoding unit decodes the encoded picture in order of inputting, to generate the plurality of slices, wherein said deblocking filter filters macro blocks included in the plurality of slices in order of generation of the respective slices, thereby generating first data composed of decoded pictures of the macro blocks included in the plurality of slices;

wherein said frame memory stores the first data, and wherein when, among the plurality of slices, a first slice decoded earlier and a second slice decoded later are positioned across a slice boundary, first processing is performed, the first processing including:

processing that said macro block memory stores second data composed of an unfiltered picture of a slice boundary-adjoining macro block of the first slice;

processing that said deblocking filter filters a slice boundary-adjoining macro block of the second slice using the second data stored in said macro block memory;

processing that said deblocking filter re-filters the slice boundary-adjoining macro block of the first slice using the second data stored in said macro block memory, thereby generating third data composed of a re-filtered picture of the slice boundary-adjoining macro block of the first slice; and processing that said deblocking filter replaces, with the third data, at least a part of the first data for the slice boundary-adjoining macro block of the first slice, the first data being already stored in said frame memory.

2. The picture decoding device as defined in claim 1, wherein when the slice boundary-adjoining macro block among the macro blocks of the first slice is composed of 16 pixels by 16 pixels (256 pixels), said deblocking filter replaces, with the third data, the first data for 128 pixels positioned nearer to the slice boundary of the slice boundary-adjoining macro block.

3. The picture decoding device as defined in claim 1, further comprising:

a control unit operable to control said deblocking filter, said frame memory, and said macro block memory, thereby controlling filtering for macro blocks adjoining the slice boundary.

4. The picture decoding device as defined in claim 1, wherein said decoding unit comprises:

a variable length decoding unit operable to decode a variable length encoded picture of an arbitrary slice order, thereby generating decoded data and a motion vector;

an inverse-quantizing unit operable to inverse-quantize the decoded data, thereby generating transformed coefficients;

an inverse orthogonal transforming unit operable to inverse-orthogonally transform the transformed coefficients to generate a difference picture;

a motion compensation unit operable, in processing the decoded data for inter-frame encoded data, to generate a predicted picture from a decoded picture already decoded and stored in said frame memory, in accordance with the motion vector generated by said variable length decoding unit; and an adding unit operable to add the difference picture and the predicted picture, thereby generating a reconstructed picture.

5. The picture decoding device as defined in claim 1, wherein decoding in said decoding unit and filtering in said deblocking filter are executed in a manner of pipe-line processing.

6. A picture decoding method comprising:

decoding an encoded picture in arbitrary slice order through predetermined transformation processing, thereby generating a plurality of slices;

filtering macro blocks of the plurality of slices for deblocking, to generate first data composed of filtered pictures of the macro blocks of the plurality of slices;

storing the first data; and storing second data composed of an unfiltered picture of a macro block among macro blocks of the plurality of slices, the macro block adjoining a slice boundary between two adjacent slices of the plurality of slices;

wherein said filtering includes filtering the slice boundary-adjoining macro block using the second data, thereby generating third data composed of a filtered picture of the slice boundary-adjoining macro block, wherein said filtering includes replacing a part of the first data with the third data, wherein said decoding includes decoding the encoded picture in order of inputting to generate the plurality of slices, wherein said filtering includes filtering macro blocks included in the plurality of slices in order of generation of the respective slices, wherein when, among the plurality of slices, a first slice decoded earlier and a second slice decoded later are positioned across a slice boundary, second processing is performed, the second processing including:

processing that said storing the second data includes storing fourth data composed of an unfiltered picture of a slice boundary-adjoining macro block of the first slice;

processing that said filtering includes filtering, using the fourth data, a slice boundary-adjoining macro block of the second slice;

processing that said filtering includes re-filtering, using the fourth data, the slice boundary-adjoining macro block of the first slice, thereby generating fifth data composed of a re-filtered picture of the slice boundary-adjoining macro block of the first slice; and processing that said filtering includes replacing, with the fifth data, at least a part of the first data for the slice boundary-adjoining macro block of the first slice, the first data being already stored in said storing the first data.

* * * * *